United States Patent Office 3,115,532
Patented Dec. 24, 1963

3,115,532
ISOMERIZATION CATALYST AND METHOD FOR MANUFACTURE THEREOF
Albert B. Schwartz, Philadelphia, Pa., assignor to Socony Mobil Oil Company, Inc., a corporation of New York
No Drawing. Filed Sept. 30, 1960, Ser. No. 59,477
7 Claims. (Cl. 260—683.65)

This invention is concerned with the manufacture of a catalyst useful in effecting the isomerization of hydrocarbons. More particularly, the present invention is directed to catalytic isomerization of isomerizable hydrocarbons having 4 to 7 carbon atoms per molecule. The invention is further directed to an improved isomerization catalyst.

In accordance with the invention, it has been found that isomerization of hydrocarbon feed stocks consisting predominantly of isomerizable hydrocarbons having 4 to 7 carbon atoms per molecule can be effectively carried out by processing the feed stocks at a temperature within the range of 400 to 1000° F., in the absence of appreciable hydrocracking, in the presence of a cerium phosphate gel catalyst in which the atomic ratio of phosphorus to cerium is within the range of 0.1 to 5.0.

In another embodiment, the invention provides for the preparation of said catalyst by reaction of a water-soluble cerium salt and an oxyacid of phosphorus or salt of said acid in concentrations and quantities to yield a hydrosol characterized by a pH between about −1 and about 2.5 and wherein the concentration of cerium is in the range of 0.1 to 5.0 gram atoms per liter of sol and thereafter permitting the hydrosol to set to a hydrogel, washing the hydrogel free of water-soluble matter, drying the washed hydrogel and calcining the dried gel.

In petroleum refining operations for the production of high octane number gasolines, it has heretofore been known to process feed stocks consisting predominantly of the lower molecular weight normally liquid aliphatic and alicyclic hydrocarbons containing 4 to 7 carbon atoms per molecule. Substantial quantities of these feed stocks are available to warrant separate processing thereof. Although octane number improvement can be obtained by treating these feed stocks in a dehydrogenation process to produce olefins, it is generally more desirable from an octane-yield relationship to utilize isomerization processes for effecting the desired octane number improvement.

Since isomerization is of importance as a unit process in an integrated refining operation for the production of high octane number gasolines, a number of catalytic isomerization processes have been proposed in the past. Thus, catalysts of the Friedel-Crafts type were used in initial development work in the catalytic isomerization of hydrocarbons. Although catalysts of this type are effective for promoting the isomerization reaction, they present handling problems due to their corrosiveness, which are overcome by use of the solid-type catalysts. The latter type catalysts eliminate plant corrosion problems and the accompanying high maintenance costs which are attendant upon the use of the Friedel-Crafts type catalyst. Such solid-type catalysts, as have been proposed or employed, generally contain amounts of a metal of the platinum series such as platinum or palladium deposited on a refractory oxide support. Such platinum-metal containing catalysts, as will be evident, are expensive and when used in isomerization generally entail the use of high operating temperatures which are disadvantageous since isomerization is an equilibrium reaction, the efficiency of which decreases with an increase in the processing temperature.

In accordance with the present invention, a catalyst has been found which overcomes the disadvantages accompanying high temperature isomerization using the previously employed supported platinum metal catalysts. In addition, the catalyst described herein is a highly selective and much less expensive commercially attractive catalyst than the previously employed platinum metal composites.

It is a principal object of the present invention to provide an efficient isomerization process for the isomerization of an isomerizable hydrocarbon in the presence of a highly selective and active catalyst. It is a further object of the invention to provide a process for the isomerization of isomerizable hydrocarbons having 4 to 7 carbon atoms in the presence of a highly selective catalyst which permits the substantial production of branched-chain isomerization products with a minimum loss of gaseous products consisting of butanes and lower molecular weight hydrocarbons. A still further object is the provision of a unique isomerization catalyst and a method for preparing such catalyst. The above and other objects which will be apparent to those skilled in the art are achieved in accordance with the present invention.

In one embodiment, the present invention comprises a process for the isomerization of an isomerizable hydrocarbon by contacting the same under isomerization conditions with a catalyst consisting essentially of a cerium phosphate cogel obtained upon removing the liquid phase from a cerium phosphate hydrogel in which the atomic ratio of phosphorus to cerium is between 0.1 and 5.0.

In another embodiment, the invention comprises a process for the isomerization of an isomerizable hydrocarbon having 4 to 7 carbon atoms per molecule at a temperature within the range of about 400° F. to 1000° F., under conditions of substantially atmospheric pressure, utilizing a liquid hourly space velocity of between about 0.5 and about 40 in the presence of a catalyst consisting essentially of a cerium phosphate cogel in which the atomic ratio of phosphorus to cerium is between 0.1 and 5.0.

In a further embodiment, the invention affords a method for preparing a cogelled oxygen-containing composite of cerium and phosphorus which comprises reacting, in aqueous solution, a water-soluble cerium salt and a water-soluble oxyacid of phosphorus or salt of said acid to yield a hydrosol characterized by an inherent capacity to set to a hydrogel having a pH between about −1 and about 2.5 and in which the atomic ratio of phosphorus to cerium is between about 0.1 and about 5.0 and wherein the concentration of cerium is in the range of 0.1 to 5.0 gram atoms per liter of hydrosol, retaining in said sol substantially all of the constituents thereof until gelation occurs, washing the hydrogel free of water-soluble matter and drying the washed hydrogel.

In still another embodiment, the invention comprises an improved cerium phosphate cogel catalyst prepared by the foregoing method.

It may be noted that methods have heretofore been known for preparing compounds comprising an oxygen-containing composite of cerium and phosphorus. Thus, cerium phosphate has, in the past, been prepared in the form of a gelatinous precipitate. Such composite precipitate is distinguishable from the cerium phosphate cogel obtained in accordance with the present invention by removing the liquid phase from a cerium phosphate hydrogel in which the atomic ratio of phosphorus to cerium is between 0.1 and 5.0. The previously formed precipitates, in contrast to the true hydrogel formed in accordance with the present invention, are inhomogeneous and such lack of homogeneity has an adverse affect on the catalytic properties thereof. Furthermore, the precipitates are structurally weak and are incapable of being formed into spheroidal particles by well known methods, for example, that described in U.S. 2,385,217. According to the process of that patent, a gelable hydrosol having an appreciable but preferably short gelation time is injected into a body of a water-immiscible liquid. The hydrosol separates in the water-immiscible liquid into a plurality of units which assume spheroidal shape. The hydrosol globules remain in the water-immiscible liquid until gelation occurs, whereupon they are removed, washed and dried. The dried product is in the form of hard transparent to translucent beads similar in general appearance to glass beads but containing a tremendous number of extremely fine pores. The use of particles in spheroidal form offers several advantages, particularly when the product is employed as a catalyst or catalyst component. Thus, spheroidal particles permit more uniform packing in a reaction or contact zone and thereby reduce variations in pressure drop and in channeling of reactants or fluids through only a portion of the contact bed. In addition, spheroidal particles are more resistant to attrition, particularly in moving bed processes since there are no sharp edges to break or wear off during the necessary handling and processing.

In the preparation of catalyst compositions, employed in the process of this invention, there is provided a cogel consisting essentially of an oxygen-containing composite of cerium and phosphorus which is referred to herein as cerium phosphate by which term, it is intended to designate broadly mixtures of oxygen-containing composites of cerium and phosphorus resulting from the formation of a gel of these compounds under conditions hereinafter set forth.

Cerium phosphate gel employed as catalyst in the process of the invention is prepared under particularly defined conditions of pH concentration and ratio of reactants. The desired cerium phosphate gel isomerization catalyst is obtained by reacting, in aqueous solution, a water-soluble salt of cerium and a water-soluble oxyacid of phosphorus or salt of such acid to yield a sol which sets to an all-embracing hydrogel having a pH between about −1 and about 2.5 and in which the ratio of phosphorus to cerium is between about 0.1 and 5.0. The hydrogel may thereafter be aged or contacted with such aqueous treating solutions as are desired for density control, base exchange, impregnation and the like, and finally washed free of soluble matter and dried. The dried gel is thereafter calcined at a temperature generally between about 350° F. and 1400° F.

It is emphasized that the above process affords cerium phosphate in the form of a true hydrogel as distinguished from a gelatinous precipitate. It has heretofore been taught that the presence of electrolyte salts in the desired hydrogel-forming mixture has the detrimental effect of coagulating cerium ions in the form of an irreversible gelatinous precipitate and not in the form of a true hydrogel. The gelatinous precipitates so produced are incapable of being formed into spheroidal particles by introduction thereof in a water-immiscible liquid and, further, have disadvantages of being structurally weak as compared with true hydrogels and of generally possessing a heterogeneous structure in comparison with the homogeneous structure achieved with true hydrogel formation. In accordance with the present invention, it has now been discovered that the presence in the cerium hydrogel-forming mixture of an oxyacid of a phosphorus or salt thereof under the conditions hereinafter set forth does not serve to coagulate the reactants in the form of a gelatinous precipitate but, on the contrary, permits the formation of a true hydrogel which can be washed, without intermediate treatment thereof, without undergoing disintegration and thereafter dried and calcined.

The present invention thus contemplates a method for preparing an isomerization catalyst consisting essentially of an oxygen-containing composite of cerium and phosphorus in the form of a hydrogel which, when dried, yields a porous adsorptive gel. It has been found that a stable hydrogel of an oxygen-containing composite of cerium and phosphorus may be prepared by mixing aqueous solutions of a water-soluble cerium salt with an oxyacid of phosphorus or salt thereof to yield a homogeneous precipitate-free hydrosol characterized by a pH within the approximate range of −1 to 2.5 and permitting the sol to set to a hydrogel.

The cerium phosphate hydrogels prepared by the process described herein are generally characterized by a gelation time of not more than two hours although it is to be realized that hydrogels having a longer time of set when desired, may also be produced by the present method. The method of this invention is particularly adaptable for the production of hydrogels characterized by a time of set in the range of 0.5 to 20 seconds which hydrogels are capable of being formed into spheroidal particles upon introducing the hydrosol in the form of globules into a water-immiscible medium and maintaining the hydrosol globules in the medium until they set to globules of hydrogel.

The concentrations of cerium in the gel product obtained is important and should be in the range of 0.1 to 5 gram atoms of cerium per liter of hydrosol from which the gel is obtained. Concentrations in the upper part of the aforesaid range are desirable for the indicated short gelation time requisite for the production of spheroidal hydrogel particles.

The pH of the hydrogel obtained in accordance with the method of this invention is an important factor in realizing formation of the desired all-embracing hydrogel. It has been found that the pH should be within the range of −1 to 2.5. Sols with too low a pH will not gel while sols with too high a pH may result in the formation of an undesired precipitate. It is within the purview of this invention to add acids or alkaline reagents including those capable of releasing acidic or basic materials upon hydrolysis such as, for example, hexamethylene tetramine, urea, ammonium acetate and the like, to the hydrosol-forming mixture to adjust the pH within the aforesaid range. It is significant that the gel products made by the method described herein do not undergo disintegration in water even though the pH, as specified, is low.

The essential compounds required for forming the cerium phosphate gel in accordance with the present process include a water-soluble cerium salt and an oxyacid of phosphorus or a salt thereof. These compounds may be intimately admixed in aqueous solution in any desired manner to yield a resulting hydrosol. The solutions may be contacted by flowing streams thereof together under conditions of rapid flow such as in a mixing nozzle. Additional components, if desired, may be introduced at this stage by dissolving a suitable compound of the desired component in one of the hydrosol-forming solutions or by mixing a stream of a compound of such desired component with the streams of the two reactants.

The water-soluble cerium salts employed may include, for example, cerium nitrate, cerium acetate, cerium bromide, cerium chloride, cerium sulfate and cerium iodide. The water-soluble oxyacid of phosphorus or salt thereof may include, for example, orthophosphoric acid, pyrophosphoric acid, metaphosphoric acid, phosphorus acid and hypophosphorus acid and salts of said acids, particularly, the alkali metal and ammonium salts which may be monobasic, dibasic, or tribasic salts of the specified acids including for example, sodium hexametaphosphate and sodium tripolyphosphate.

The quantity and concentration of the reactant solutions employed, is, in accordance with the invention, controlled to afford a resulting gel product in which the atomic ratio of phosphorus to cerium is within the range of 0.1 to 5.0. It has been found that if the above ratio exceeds about 5.0, formation of a precipitate rather than a true all-embracing hydrogel may be encountered and that if the above ratio is less than about 0.1, the resulting solution takes an excessively long time to gel or fails to get at all. It is thus essential to the success of the present invention that the atomic ratio of phosphorus to cerium be between about 0.1 and about 5.0.

Hydrosols prepared in accordance with the present process may be allowed to set to an all-embracing hydrogel in the form of a mass which is thereafter broken up or cut up into particles for wet processing. An alternate method for preparing the hydrogen particles is to drop the hydrosol in the form of globules into a column of water-immiscible liquid so that spheroidal bead-like particles of hydrogel are formed upon gelation of the hydrosol globules while maintained in the liquid.

The hydrogel particles so obtained are water-washed free of soluble matter. A particularly preferred method for washing the hydrogel is by percolation either with upward or downward flow of water. After washing, the hydrogel particles are dried generally at a temperature between about 150° F. and about 350° F. for 2 to 24 hours or more or dried at such temperature and then calcined at a temperature from about 350° F. to about 1400° F. for about 2 to 12 hours or more. Generally, it is preferred to dry the hydrogel particles in air or an atmosphere of super-heated steam at a slow rate since such manner of operation has been found to result in less breakage of the gel particles. Calcining is ordinarily carried out in air although other inert atmospheres may, likewise, be used.

The oxygen-containing cogel composites of cerium and phosphorus, produced in accordance with the process described herein, have been found to be particularly effective isomerization catalysts. Thus, the catalyst described hereinabove has been found to be especially applicable in effecting isomerization of isomerizable hydrocarbons including acyclic paraffins and cyclic naphthenes and is particularly suitable for the isomerization of hydrocarbons containing 4 to 7 carbon atoms per molecule including normal butane, normal pentane, normal hexane, normal heptane; cycloparaffins ordinarily containing at least 5 carbon atoms in the range such as alkylcyclopentanes, and cyclohexanes, including methylcyclopentane, dimethylcylopentane, cyclohexane, methylcyclohexane, and dimethylcyclohexanes. The catalyst described herein is also effective for the isomerization of saturated and unsaturated naphthenes including, for example, the isomerization of methylcyclopentene to cyclohexene and the equilibrium reaction of cyclohexene to methylcyclopentene. The present catalyst is further applicable in effecting conversion of mixtures of paraffins and/or naphthenes such as those derived by selective fractionation and distillation of straight-run or natural gasolines and naphthenes. Such mixtures of paraffins and/or naphthenes include pentane fractions, normal hexane fractions and mixtures thereof. The process described herein is also suitable for the isomerization of olefins, for example, the isomerization of 1-butene to 2-butene, and the isomerization of 3-methyl-1-butene to 2-methyl-2-butene. The process may also be used for the isomerization of alkyl aromatic hydrocarbons, for example, the isomerization of ethylbenzene to dimethylbenzene or xylene, and the isomerization of propylbenzene to methylethylbenzene or trimethylbenzene.

Isomerization, described hereinabove, is not necessarily but may, if desired, be effected in an atmosphere of hydrogen. The hydrogen when used may be supplied from any convenient source and will generally be recycled within the process so that hydrogen consumption will be, for all practical purposes, negligible. The hydrogen utilized may be in a pure state or may be diluted with various inert materials such as nitrogen, methane, ethane, and/or propane.

The operating conditions employed will depend upon the particular compound being isomerized and, generally, will be at temperatures between about 400° F. and about 1000° F. and at approximately atmospheric pressure. The liquid hourly space velocity employed, i.e. the liquid volume of hydrocarbon per hour per volume of catalyst is between about 0.5 and about 40 and, preferably, between about 2 and about 5. All of the aforementioned variables are interrelated. As a practical matter, the temperature of operation is generally fixed as a result of primary choices with respect to the other variables and the desired conversion level.

The process of this invention may be carried out in any equipment suitable for catalytic isomerization operations. The process may be operated batchwise. It is preferable, however, and generally more feasible to operate continuously. Accordingly, the instant isomerization process is adapted to operations using a fixed bed of catalyst. In such a process, the hydrocarbon charge to be isomerized may be passed together with hydrogen in either an upward or downward flow through the catalyst bed. The reaction products are then separated from the hydrogen, which is recycled, and subjected to fractionation and separation of the desired reaction products. Recovered starting material is recycled so that the overall process yield is high. Also, the process can be operated using a moving bed of catalyst wherein the hydrocarbon feed may be concurrent or countercurrent to the catalyst flow. Another means of effecting the isomerization reaction of the present invention is to employ a fluidized fixed bed of catalyst wherein the reactant or reactants are passed through the bed of catalytic material at a sufficient rate to maintain the individual particles of catalyst in suspension. If desired, the catalyst for such operation may be utilized in the form of micro-particles and the process may be effected in a two-zone fluidized transfer process. In such a process when it is desired to regenerate the catalyst or to reactivate it by other means, the catalytic material may be suspended in a gas stream and conveyed to a second zone wherein it is reactivated after which the reactivated catalyst is returned to the reaction zone wherein it is utilized to effect further reaction. Regardless of the particular operation employed, the products are fractionated or otherwise separated to recover the desired product and to separate unconverted material which may be recycled. Hydrogen in the effluent product, likewise, is separated and preferably is recycled.

The following example will serve to illustrate the catalyst and isomerization process of the present invention without limiting the same.

A cerium phosphate hydrogel was prepared by mixing 200 ml. of an aqueous solution containing 39.7 grams $Ce(SO_4)_2$ and 9.9 grams of 96.4 percent $H_2SO_4$ with 80 ml. of an aqueous solution containing 20 grams of 85.9 percent $H_3PO_4$. The resulting sol containing 0.42 gram atoms of cerium per liter and having a pH of 0.9 gelled in about 3 minutes. The hydrogel so obtained was water-washed free of soluble matter, dried in air at 170° F. and thereafter calcined for 5 hours in air at 400° F. The atomic ratio of P/Ce in the gel product, as calculated, was 1.5.

A portion of the product was calcined for 3 hours at 1000° F. and thereafter tested for isomerization activity. Conversion of cyclohexene to methylcyclopentenes at 600° F. was carried out by injecting into a stream of hydrogen carrier gas, cyclohexene and passing the resulting stream as a pulse over the catalyst at a liquid hourly space velocity of 1.4 volumes per hour per volume of catalyst. The catalyst afforded 92 percent weight conversion of the cyclohexene charge to methylcyclopentenes.

For purposes of comparison, phosphate gels of various other metals were prepared in accordance with the general procedure of the above example and tested for isomerization activity in conversion of cyclohexene.

The results of such comparative examples are shown in the table below:

| Catalyst | Preparation | | | Isomerization of Cyclohexene | |
|---|---|---|---|---|---|
| | P/Metal Atomic Ratio | g.-atom metal per liter | pH | Conv., percent wt. | Methyl-cyclopentenes, percent wt. |
| Ceric Phosphate | 1.5 | 0.42 | 0.9 | 100 | 92 |
| Stannic Phosphate | 2.4 | 0.58 | 1.0 | 2.9 | 0.5 |
| Chromic Phosphate | 0.09 | 1.8 | 0.4 | 98 | 12 |
| Thorium Phosphate | 0.45 | 1.1 | 1.0 | 98 | 26 |
| Aluminum Phosphate | 0.58 | 0.25 | 4.3 | 44 | 17 |

It will be seen from the foregoing comparative results that the cerium phosphate cogel catalyst of the invention afforded an unexpectedly high conversion of the isomerization charge to isomer product. In contradistinction to cerium phosphate, the various other metal phosphates tested for isomerization activity afforded only negligible or minor conversion of the charge to useful isomer product.

It is accordingly evident that the cerium phosphate gel described herein is an unusually active and selective catalyst for effecting isomerization. It will thus be understood that the above description is merely illustrative of preferred embodiments of this invention of which many variations may be made by those skilled in the art without departing from the spirit thereof.

I claim:

1. A process for the isomerization of an isomerizable hydrocarbon having 4 to 7 carbon atoms per molecule at a temperature within the range of about 400° F. to about 1000° F., under conditions of substantially atmospheric pressure, utilizing a liquid hourly space velocity of between about 0.5 and about 40 in the presence of a catalyst consisting essentially of a cerium phosphate cogel in which the atomic ratio of phosphorus to cerium is between 0.1 and 5.0.

2. A method for preparing an oxygen-containing cogel composite of cerium and phosphorus which comprises reacting, in aqueous solution, a water-soluble cerium salt and a water-soluble compound selected from the group consisting of oxyacids of phosphorus and salts of said acids in concentrations and quantities to yield a hydrosol characterized by an inherent capacity to set to a hydrogel, having a pH between about −1 and about 2.5 and in which the atomic ratio of phosphorus to cerium is between about 0.1 and about 5.0, and wherein the concentration of cerium is in the range of 0.1 to 5.0 gram atoms per liter of hydrosol, retaining in said soil substantially all the constituents thereof until gelation occurs, washing the hydrogel free of water-soluble matter and drying the washed hydrogel.

3. An isomerization catalyst consisting essentially of a cerium phosphate cogel resulting from reaction, in aqueous solution, of a water-soluble cerium salt and a water-soluble compound selected from the group consisting of oxyacids of phosphorus and salts of said acids to yield a hydrosol characterized by an inherent capacity to set to a hydrogel, having a pH between about −1 and about 2.5 and in which the atomic ratio of phosphorus to cerium is between about 0.1 and about 5.0, and wherein the concentration of cerium is in the range of 0.1 to 5.0 gram atoms per liter of hydrosol, retaining in said sol substantially all the constituents thereof until gelation occurs, washing the hydrogel free of water-soluble matter and drying the washed hydrogel.

4. A process for the isomerization of an isomerizable hydrocarbon by contacting the same under isomerization conditions with a catalyst consisting essentially of a cerium phosphate cogel resulting from the reaction, in aqueous solution, of a water-soluble cerium salt and a water-soluble compound selected from the group consisting of oxyacids of phosphorus and salts of said acids to yield a hydrosol characterized by an inherent capacity to set to a hydrogel, having a pH between about −1 and about 2.5 and in which the atomic ratio of phosphorus to cerium is between about 0.1 and about 5.0, and wherein the concentration of cerium is in the range of 0.1 to 5.0 gram atoms per liter of hydrosol, retaining in said sol substantially all the constituents thereof until gelation occurs, washing the hydrogel free of water-soluble matter and drying the washed hydrogel.

5. A process for the isomerization of an isomerizable hydrocarbon having 4 to 7 carbon atoms per molecule which comprises contacting said hydrocarbon at a temperature within the range of about 400° F. to about 1000° F., under conditions of substantially atmospheric pressure, utilizing a liquid hourly space velocity of between about 0.5 and about 40 with a catalyst consisting essentially of a cerium phosphate cogel resulting from reaction in aqueous solution of a water-soluble cerium salt and a water-soluble compound selected from the group consisting of oxyacids of phosphorus and salts of said acids to yield a hydrosol characterized by an inherent capacity to set to a hydrogel, having a pH between about −1 and about 2.5 and in which the atomic ratio of phosphorus to cerium is between about 0.1 and about 5.0, and wherein the concentration of cerium is in the range of 0.1 to 5.0 gram atoms per liter of hydrosol, retaining in said sol substantially all the constituents thereof until gelation occurs, washing the hydrogel free of water-soluble matter and drying the washed hydrogel.

6. A method for preparing an oxygen-containing cogel composite of cerium and phosphorus which comprises reacting, in aqueous solution, a water-soluble cerium salt and a water-soluble compound selected from the group consisting of oxyacids of phosphorus and salts of said acids in concentrations and quantities to yield a hydrosol capable of setting to a hydrogel in not more than 2 hours and characterized by a pH in the approximate range of −1 to 2.5 and in which the atomic ratio of phosphorus to cerium is between about 0.1 and about 5.0 and wherein the concentration of cerium is in the range of 0.1 to 5.0 gram atoms per liter of hydrosol, permitting said hydrosol to set to a hydrogel, washing the hydrogel free of water-soluble matter, drying the washed hydrogel and calcining the dried gel.

7. A process for the isomerization of cyclohexene which comprises contacting cyclohexene under isomerization conditions with a catalyst consisting essentially of a cerium phosphate cogel obtained upon removing the liquid phase from a cerium phosphate hydrogel in which the atomic ratio of phosphorus to cerium is between 0.1 and 5.0.

References Cited in the file of this patent

UNITED STATES PATENTS 2,527,522    Bond et al.             Oct. 31, 1950